United States Patent
Gonzalez et al.

(10) Patent No.: US 8,347,250 B2
(45) Date of Patent: Jan. 1, 2013

(54) METHOD AND APPARATUS FOR ADDRESSING AND IMPROVING HOLDS IN LOGIC NETWORKS

(75) Inventors: George A. Gonzalez, Austin, TX (US); Pete J. Hannan, Austin, TX (US); William A. McGee, San Jose, CA (US); Vasant Palisetti, Santa Clara, CA (US); Ashok Venkatachar, Santa Clara, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 81 days.

(21) Appl. No.: 12/975,668

(22) Filed: Dec. 22, 2010

(65) Prior Publication Data
US 2012/0167030 A1 Jun. 28, 2012

(51) Int. Cl.
*G06F 17/50* (2006.01)
(52) U.S. Cl. .................. 716/114; 716/113
(58) Field of Classification Search ........... 716/113–114
See application file for complete search history.

(56) References Cited

U.S. PATENT DOCUMENTS

| | | | |
|---|---|---|---|
| 6,427,226 B1* | 7/2002 | Mallick et al. ............... | 716/113 |
| 7,251,797 B2* | 7/2007 | Becer et al. .................. | 716/113 |
| 7,278,126 B2* | 10/2007 | Sun et al. ..................... | 716/114 |
| 7,480,881 B2* | 1/2009 | Tetelbaum et al. ........... | 716/113 |
| 7,506,293 B2* | 3/2009 | Dasdan et al. ............... | 716/113 |
| 7,689,957 B2* | 3/2010 | Shenoy ........................ | 716/113 |
| 7,797,601 B2* | 9/2010 | Kapur et al. ................. | 714/726 |
| 2003/0177455 A1* | 9/2003 | Kaufman et al. ............. | 716/2 |
| 2005/0010889 A1* | 1/2005 | Barnes .......................... | 716/11 |
| 2005/0268263 A1* | 12/2005 | Sun et al. ..................... | 716/6 |
| 2008/0295053 A1* | 11/2008 | Dasdan et al. ............... | 716/6 |
| 2008/0295054 A1* | 11/2008 | Alter et al. ................... | 716/6 |

* cited by examiner

*Primary Examiner* — Stacy Whitmore
(74) *Attorney, Agent, or Firm* — Volpe and Koenig, P.C.

(57) ABSTRACT

A method and apparatus for modifying a synchronous logic network so that the hold slack calculated at all pins is greater than or equal to a user-specified threshold, with the condition that the setup slack at any pin does not become negative or smaller than a user-specified margin. The result is an improved design which is less likely to fail due to a hold time violation. The method and apparatus introduce a limited number of logic cells which helps keep power consumption and design size to a minimum.

20 Claims, 13 Drawing Sheets

| Class A (Hold Slack = 1) | Class B (Hold Slack = 2) | Class B (Hold Slack = 4) |
|---|---|---|
| 510, 511, 513 | 501, 504, 505, 506, 512, 514, 515, 516, 517, 518, 521, 522, 523, 524, 525, 527 | 502, 503, 507, 508, 509, 519, 525, 526 |

FIG. 10

| Class C Pins (Hold Slack = 4) | Critical Congestion Value | Rank (Based on Critical Congestion Value) | General Congestion Value | Final Rank |
|---|---|---|---|---|
| 502 | 4 | 1 | 9 | 2 |
| 503 | 2 | 2 | 5 | 5 |
| 507 | 2 | 2 | 4 | 4 |
| 508 | 2 | 2 | 4 | 4 |
| 509 | 4 | 1 | 8 | 1 |
| 519 | 2 | 2 | 2 | 3 |
| 520 | 2 | 2 | 2 | 3 |
| 526 | 2 | 2 | 2 | 3 |

FIG. 11

METHOD AND APPARATUS FOR ADDRESSING AND IMPROVING HOLDS IN LOGIC NETWORKS

FIELD OF INVENTION

This application is related to improved timing analysis.

BACKGROUND

A logic network of a circuit may be analyzed to identify timing problems in the design of a circuit. A single hold analysis violation that manifests in silicon can cause a functional failure, rendering the product unusable. A thorough analysis and resolution of all potential hold failures is therefore critical to the viability of the final product. When a particular place in a design exhibits a hold race, (a violation of the hold analysis), tens of thousands of similar paths could be related to this same electrical failure. Determining the most optimal location to insert delay cells to address all failures is challenging and resource intensive.

Design engineers must add enough delay cells within a path to slow down the data in order to meet the hold requirement of the downstream flop, but must avoid putting too many delay cells in, which may violate the setup requirements of the path and related paths. There is a balance between having just the right amount of logic to meet the hold requirements and not breaking the timing requirements.

There may be several ways to insert delay cells to fix hold failures and not violate setup timing requirements. However, some possible solutions may adversely impact power if too many delay cells are inserted into a design.

There is a need to address situations where there is a hold race, and to provide automated feedback to design engineers to enable a solution which optimizes a balance in delay, power, and electrical robustness. Currently, there is a need to identify an optimal set and location of points to address hold analysis in a structure custom cell-based design.

SUMMARY OF EMBODIMENTS

A method and apparatus for modifying a synchronous logic network so that the hold slack calculated at all pins is greater than or equal to a user-specified threshold, with the condition that the setup slack at any pin does not become negative or smaller than a user-specified margin. The result is an improved design which is less likely to fail due to a hold time violation. The method and apparatus limit the number of logic cells, which helps keep power consumption and design size to a minimum.

BRIEF DESCRIPTION OF THE DRAWINGS

A more detailed understanding may be had from the following description, given by way of example in conjunction with the accompanying drawings wherein:

FIG. 10 shows a chart grouping the pins in the critical network of FIG. 5 into classes with equivalent hold slacks;

FIG. 11 shows a chart ranking the pins of Class B, wherein each pin in Class B is ranked based on it critical congestion value;

DETAILED DESCRIPTION

Figure 1:
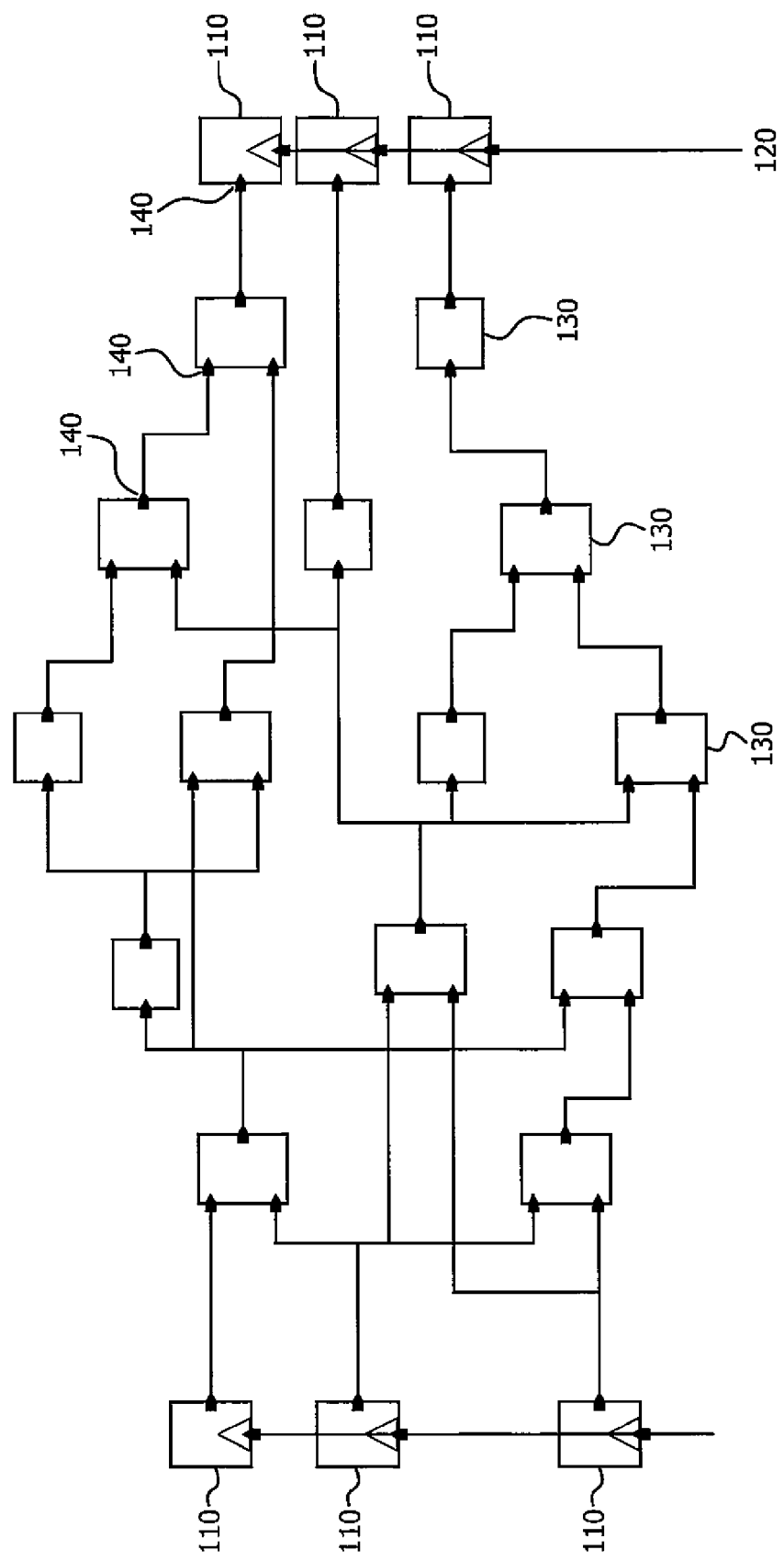
FIG. 1 is a schematic representation of a logic network.

Logic networks typically comprise logic cells and state cells. State cells may provide storage for logic values and may serve as memory for a digital system. In a synchronized logic network, state cells may change value in synchrony with a periodic clock signal. FIG. 1 is a schematic representation of a logic network.

FIG. 1 shows a plurality of state cells 110, a clock 120, a plurality of logic cells 130, and the pins 140 associated with each logic cell 130. State cells 110 are a type of cell that captures logic values to be preserved for the next clock 120 cycle. Logic cells 130 are cells with calculated values based on the logic values of the state cells 110. Logic cells 130, or logic gates, differ from state cells 110 in that they are not synchronized to a clock 120 signal and may transmit logic from input to output as soon as a clock 120 signal arrives at the input, (but subject to a delay inherent to logic cells 130).

A state cell 110 may be configured to change state when a clock 120 signal transitions from a logic value 0 to a logic value 1. In this case, the state cell may capture the data on the clock 120 signal's rising transition. To successfully capture the data, the signal at the input of the state cell 110 must be present some amount of time before the clock signal rises. This margin of time may be called the setup time of the cell. Subtracting the setup time from the time at which the clock signal may rise yields the required setup arrival time ($T_{rs}$). If the state cell 110's input data arrives after the $T_{rs}$ its logic value may not be captured by the state cell 110. This may result in a failure of the system in which the logic network is realized.

The state cell 110's input signal should arrive early enough to avoid violating the setup constraint, but it must not arrive too early. Otherwise, the state cell 110 will not have enough time to read the value from the previous computation. This may be avoided by ensuring that the signal holds constant for an amount of time past the capturing transition of the clock 120. This margin may be called the state cell 110's hold time.

To verify the viability of a design, a static timing analyzer performs static timing analysis (STA) to examine a representation of the logic network to reveal areas which may cause failures related to setup and hold constraints.

For each pin 140 in the design, the STA may calculate the maximum arrival time ($T_{max}$), the minimum arrival time ($T_{min}$), the required setup arrival time ($T_{rs}$), the required hold arrival time ($T_{rh}$), the setup slack, and the hold slack. $T_{max}$ may be the upper-bounded time at which a signal may arrive, (i.e., signal may transition), at the pin. $T_{min}$ may be the lower-bounded time at which a signal may transition at the pin. $T_{rs}$ may be the time before which all signals of the current cycle of computation must arrive to avoid violating any setup constraint. $T_{rh}$ may be the time after which all signals of the next cycle of computation must arrive to avoid violating any hold constraint.

The setup slack may be the pin 140's $T_{rs}$ minus the pin 140's $T_{max}$. A positive value may represent the amount of time delay which may be inserted without violating any setup constraints; (in other words how much room exists to slow down the path). A negative value may represent the amount by which a setup constraint has been violated.

The hold slack may be the pin 140's $T_{rh}$ minus the pin 140's $T_{min}$. A positive value may represent the amount of delay which may be removed without violating any hold constraints, in other words how much room exists to speed up the path. A negative value may represent the amount by which a hold constraint is violated.

The STA may calculate the clock cycle time, described above, the setup and hold times of the states cells 110, and other data such as the connectivity of the design, the delay inherent to each logic cell 130, and the delay properties of the cell interconnections.

Figure 2:
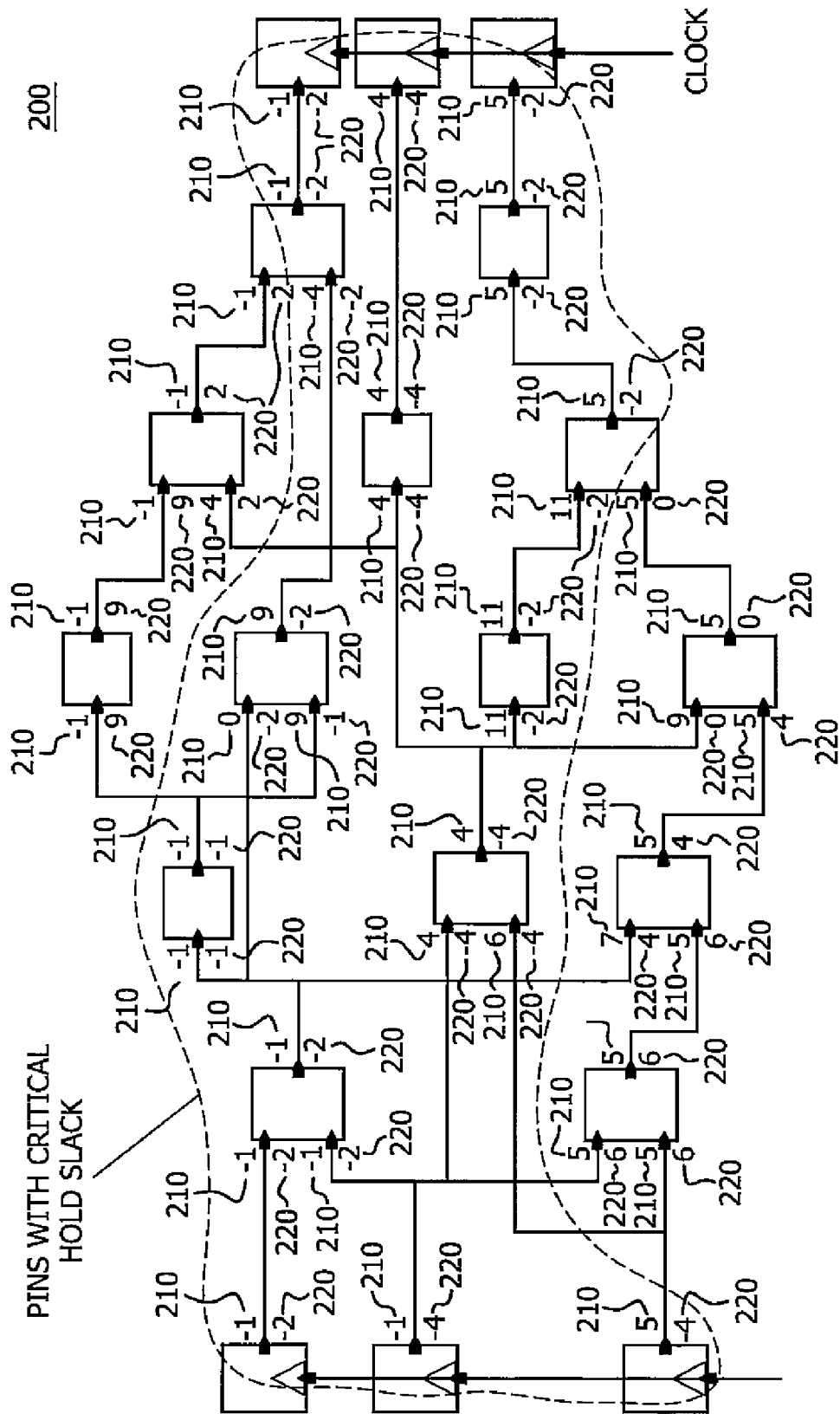
FIG. 2 shows pins labeled above with setup slack and below with hold slack.

FIG. 2 illustrates a logic network 200 with setup slacks 210 (at the top of each pin) and hold slacks 220 (at the bottom of each pin) as a static timing analyzer might calculate. In practice, the numeric values contain more significant digits. It should be noted that different slack values may be associated with rising versus falling signals and with different clock phases. Networks may vary in the number of cells and interconnections. Cell delays associated with setup slack calculation may be different than those used for hold slack calculation.

Figure 3:
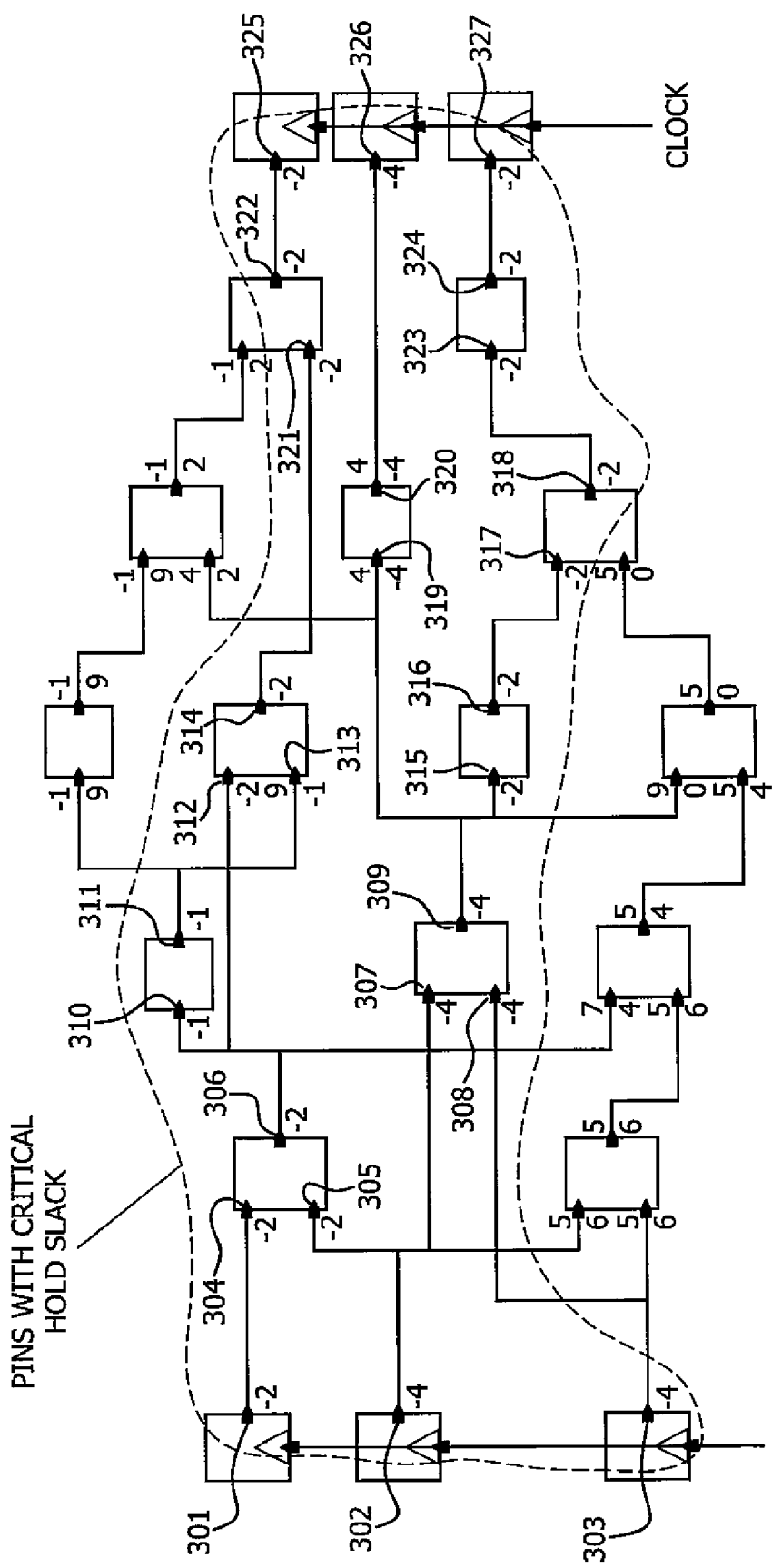
FIG. 3 shows pins with a critical hold slack.

FIG. 3 illustrates pins 304 (for example) with critical hold slack. Pin 304 (for example) is one of the pins located within the dotted line of FIG. 2. A pin 304 may have critical hold slack, −2, where the value of the hold slack is less than or equal to a user-specified threshold. In FIG. 3, the user-specified threshold has been set to zero; therefore all of the pins within the dotted line have a hold slack less than or equal to zero.

Figure 4:
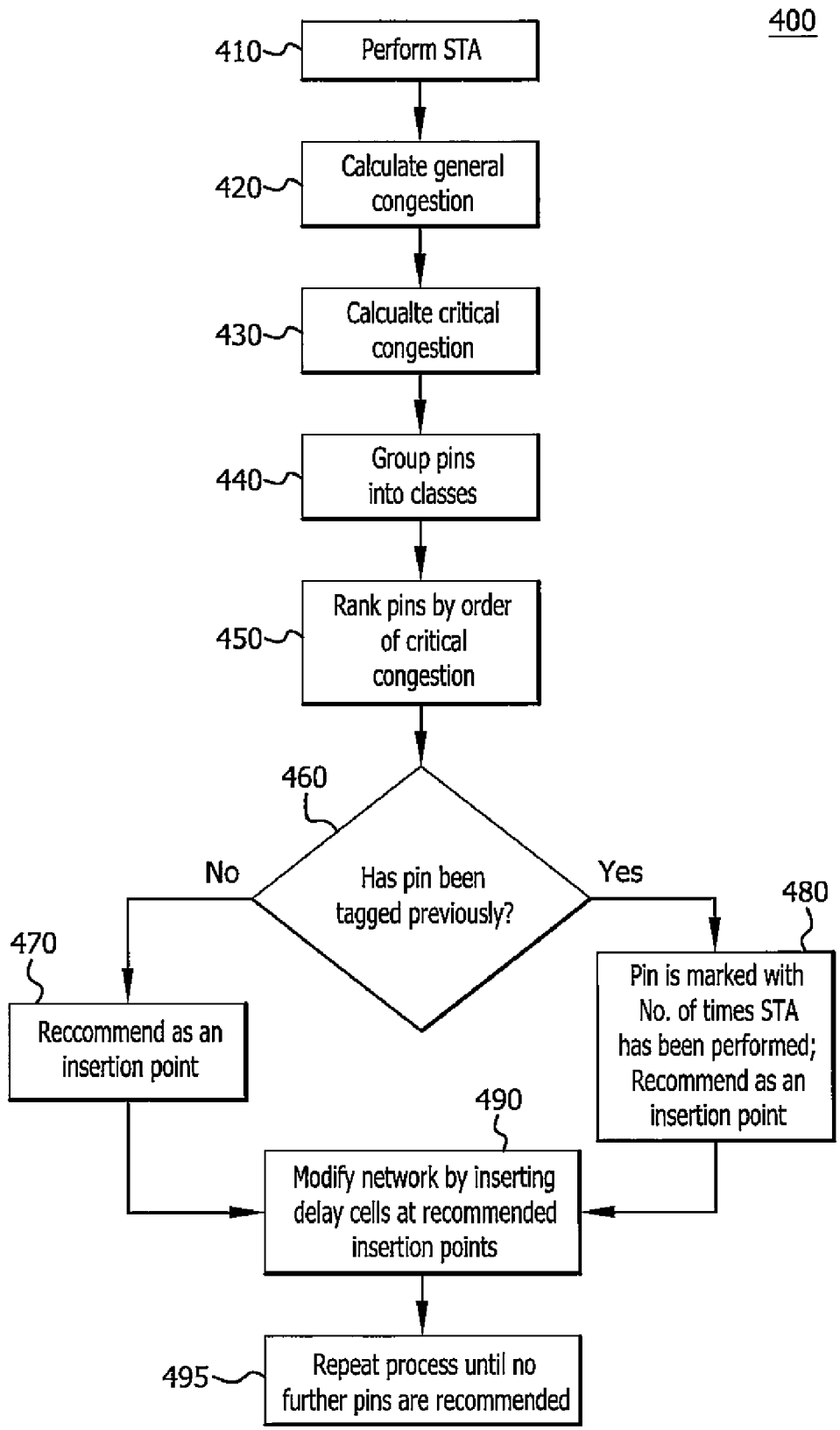
FIG. 4 shows the process of improving hold slack in a structure custom cell-based design.

A process for improving hold slack may be described as a series of steps. FIG. 4 is a flow diagram of a method 400 for improving hold slack in a structure custom cell-based design, which is an overview of the process described in further detail below. The method 400 includes performing STA to provide setup and hold slack values of a logic network (step 410). The hold slack value for each is used to calculate general congestion for each pin in the logic network (step 420). The hold slack values are also used to determine a critical network. The pins with a hold slack that is less than a user-specified threshold make up the critical network. The critical congestion is calculated for each pin in the critical network (step 430). The pins are grouped into classes based on their hold slacks, with approximately equivalent hold slack grouped in the same class (step 440). Once each pin is classified the pins in each class are ranked by order of critical congestion, where pins with the greatest critical congestion are ranked highest (step 450). For each pin, in order of decreasing rank, a determination is made whether the pin has been previously tagged (step 460). If a pin has been previously tagged, it may already be marked with the number of times STA was performed (step 480). If the pin has not been tagged before or if it has been tagged, but only with a number of times less than the number of times STA has been performed, it is recommended as an insertion point (step 470). The network is then modified by inserting delay cells at each of the recommended insertion points (step 490). The method is repeated until no further pins are recommended (step 495).

First, a static timing analysis may be performed (step 410 in FIG. 4) by an STA on a representation of the design. The STA calculates the setup slack and hold slack at all pins in the network and annotates a schematic with numerical values, as described above in FIG. 2.

Second, the general congestion of the logic network may be calculated (step 420 in FIG. 4). The general congestion may be defined as the number of unique paths that exist through a pin in the logic network. The value of general congestion may be used later in the process as a "tie breaker" when pins in a critical network are ranked (step 450 in FIG. 4).

A "critical network" may be defined as a reduced version of the logic network with elements removed. The critical network may be obtained by removing pins that are sub-critical, (having a calculated hold slack that is greater than a user-specified threshold). The critical network is shown within the dotted lines of FIG. 3. Each pin 304 (for example) in FIG. 3 that has a hold slack less than or equal to zero is used to form the critical network The critical network may be conceptual, and removing pins is not a step in the process described. It is described herein so that the concept of "critical congestion" may be established.

Figure 5:
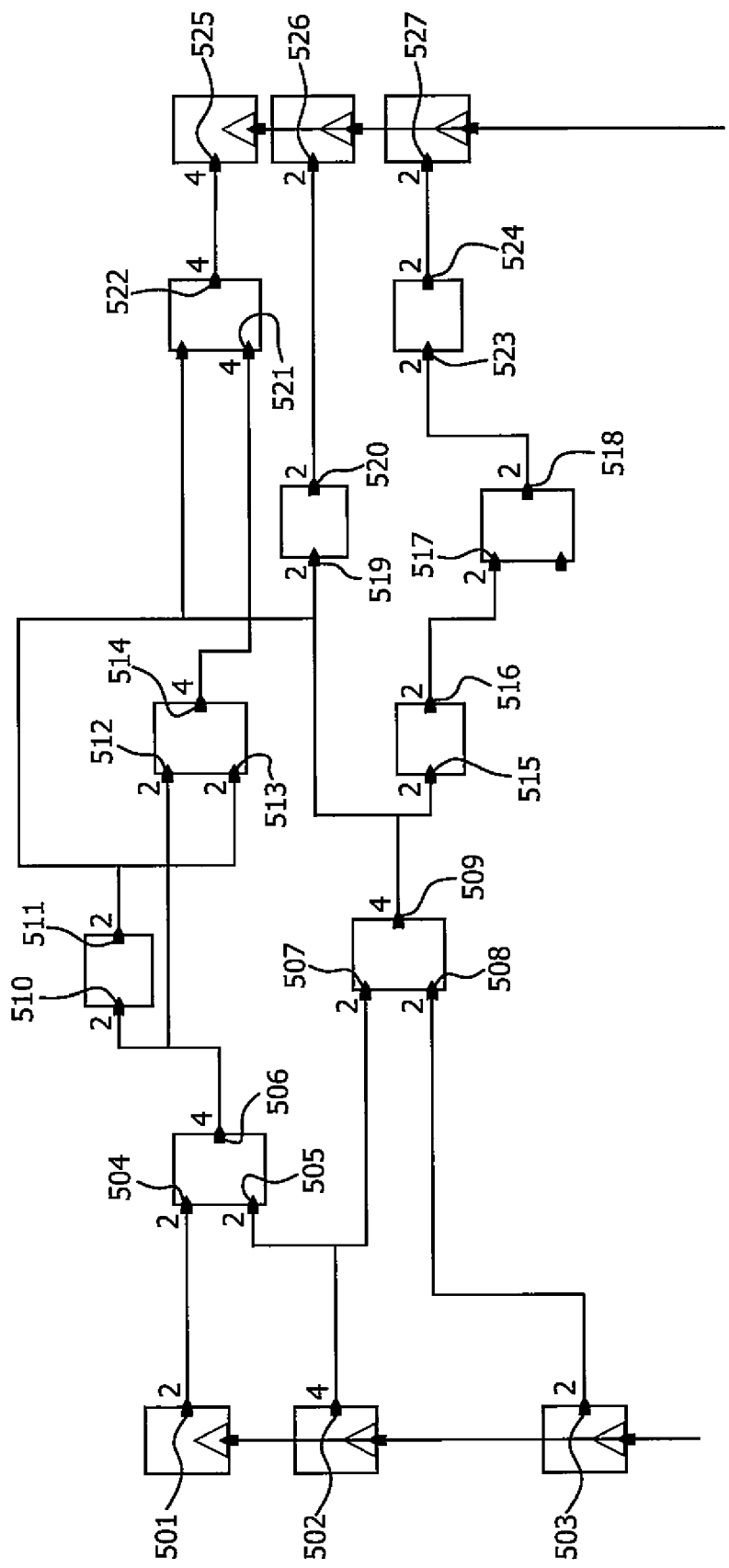
FIG. 5 shows a critical network resulting from FIG. 3 and a user specified threshold of 0 (the pins are labeled with critical congestion values)

Third, the critical congestion for each pin in the critical network may be calculated (step 430 in FIG. 4). Critical congestion may be defined as the congestion calculated in the critical network. FIG. 5 illustrates the pins 501 (for example) in the critical network labeled with a critical congestion value. In practice, the calculation of critical congestion may be implemented algorithmically using a representation of the entire network. As describe hereinafter, congestion, both general and critical, may be calculated, by performing a calculation at each pin in a particular order. This can be determined in one of several ways including levelization and topological sort.

Figure 6:
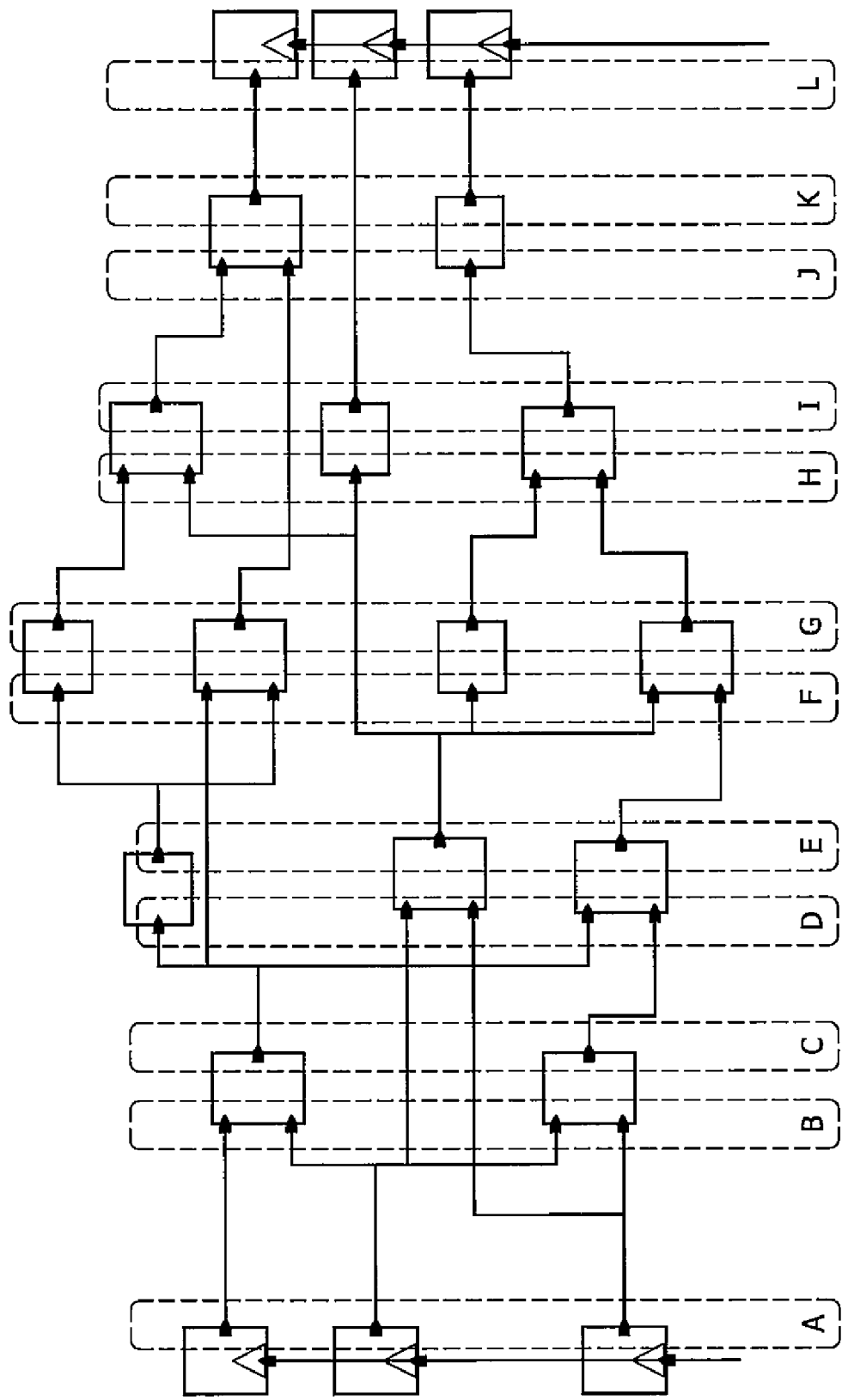
FIG. 6 shows forward levelized order: A, B, C . . . L and reverse levelized order L, K, J . . . A.

Levelization, is a process by which pins are grouped into levels A, B, C, etc. which can be seen in FIG. 6. Congestion may be calculated via levelization, using three steps. First, the backward path count at every pin in a forward levelized order A, B, C . . . L may be calculated. If a pin is the output of a state cell or is a primary output, (a logic net intended to present digital information to other parts of a system, i.e. logic that is not part of the design being considered), it is labeled with a backward path count of 1. Otherwise label it with a backward path count equal to the sum of the backward path counts of its predecessors. Second, the forward path count at every pin in a reverse levelized order L, K, J . . . A may be calculated. If the pin is the input of a state cell or is a primary output, it is labeled with a forward path count of 1. Otherwise it is labeled with a forward path count equal to the sum of the forward path counts of its successors. Third, for each pin, the forward path count is multiplied with its backward path count to obtain a congestion value.

Figure 7:
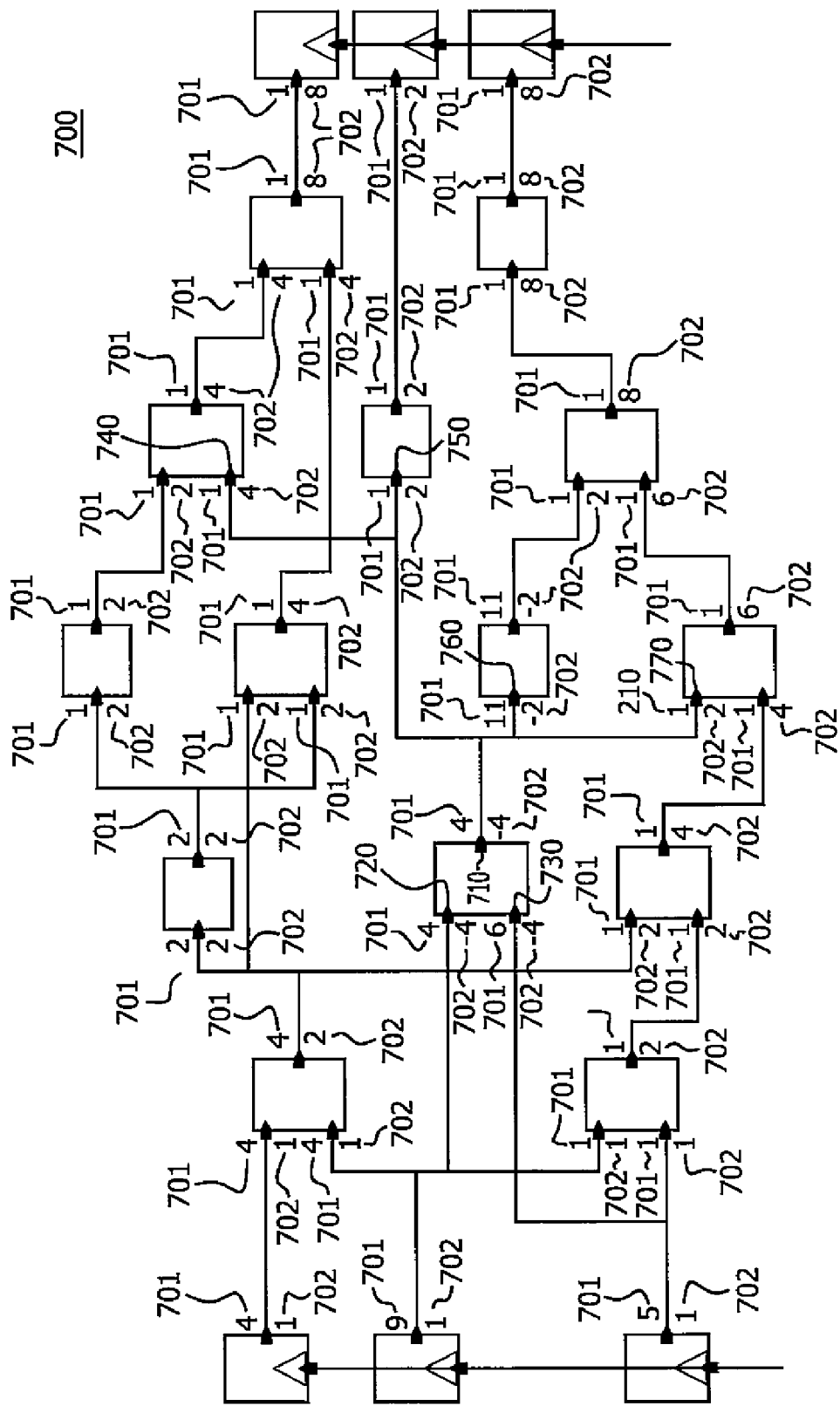
FIG. 7 shows pins in a logic network labeled with forward and backward path counts.

FIG. 7 shows a logic network 700 with pin 720 (for example) with a forward path count 701 and a backward path count 702. To calculate general congestion of pin 720 levelization may be used following the steps described above. First a backward path count 702 is calculated. Pin 720 is an output of a state cell and therefore has a backward path count 702 of 1. Second a forward path count 701 is calculated. Pin 720 is not an input of a state cell or a primary output and therefore has a forward path count 701 equal to the sum of pin 720's successors, pin 710. Pin 710 has a forward path count 701 equal to 4 and therefore pin 720 has a forward path count 701 equal to 4. Third, the backward path count 702 of pin 720 has a value of 1 and the forward path count 701 of pin 720 has a value of 4 are multiplied together to get a general congestion of 4.

A second calculation of general congestion for a pin 710 (for example), that is not a state cell or a primary input, is also described. First, the backward path count 702 of pin 710 is calculated. Pin 710 has a backward path count 702 equal to the sum of the backward path counts 702 of pin 710's predecessors, pins 720 and 730. Pin 720 has a backward path count 702 of 1 and pin 730 has a backward path count 702 of 1 and when the two pins 720 and 730 are summed, a backward path count 702 of 2 is the resulting backward path count 702 for pin 710. Second, the forward path 701 of pin 710 is calculated. Pin 710 has a forward path count 701 equal to the sum of the forward path counts 701 of pin 710's successors, pins 740, 750, 760, and 770. Pin 740 has a forward path count 701 of 1, pin 750 has a forward path count 701 of 1, pin 760 has a forward path count 701 of 1, and pin 770 has a forward path count 701 and when pins 740, 750, 760, and 770 are summed, a forward path count 701 of 4 is the resulting forward path count 701 for pin 710. Third, the backward path count 702 of pin 710 has a value of 2 and the forward path count 701 of pin 710 has a value of 4 are multiplied together to get a general congestion value of 8.

Figure 8:
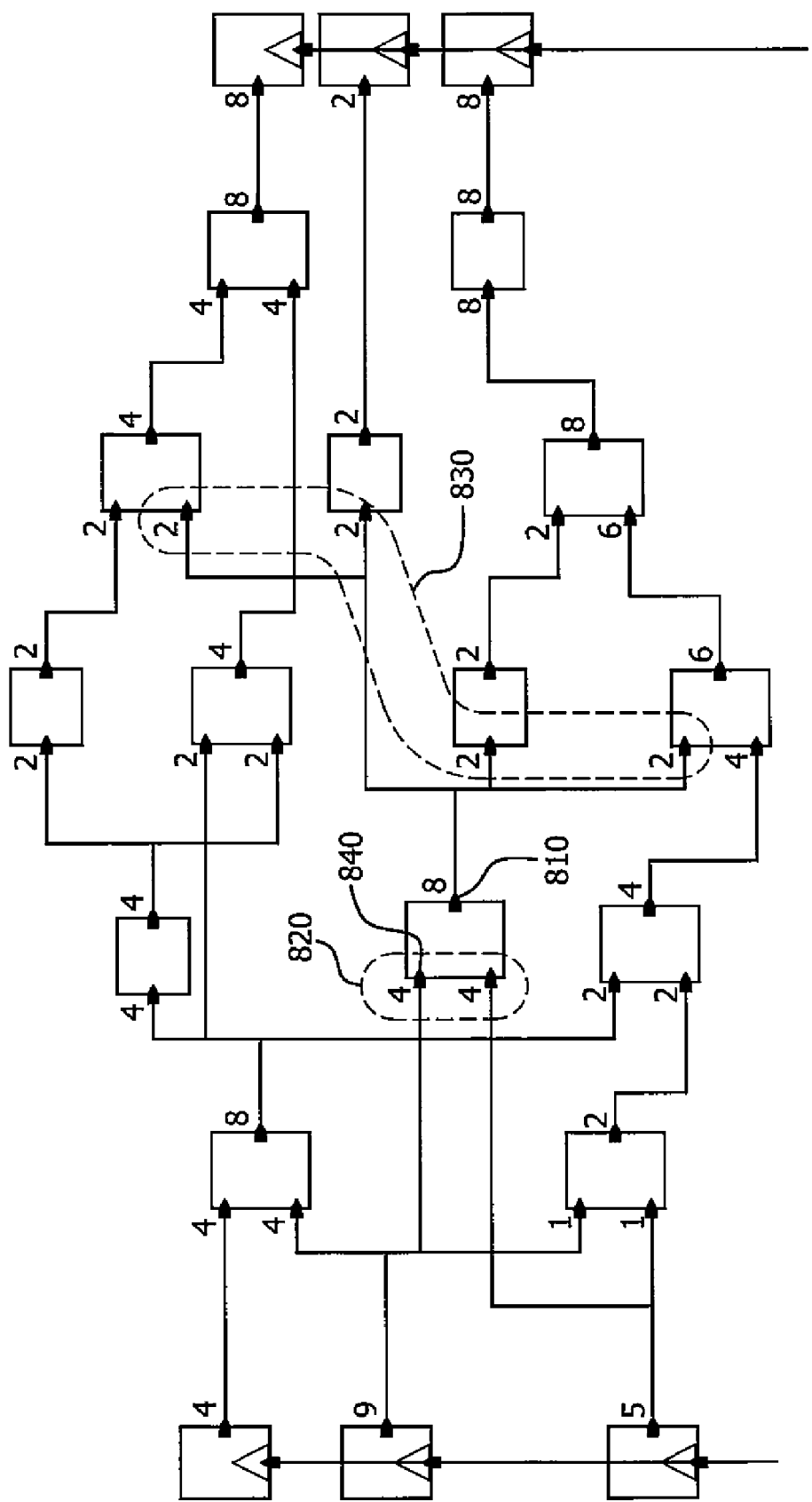
FIG. 8 shows predecessors and successors (pins are labeled with general congestion values)

FIG. 8 illustrates the value of general congestion for pin 810 (equivalent to pin 710 in FIG. 7) based on the calculations described above. As can be seen in FIG. 8, the general congestion value of pin 810 is equal to 8 and the general congestion value of pin 840 (equivalent to pin 720 in FIG. 7) is 4. FIG. 8 also shows the predecessors 820 and successors 830 of pin 810.

Figure 9:
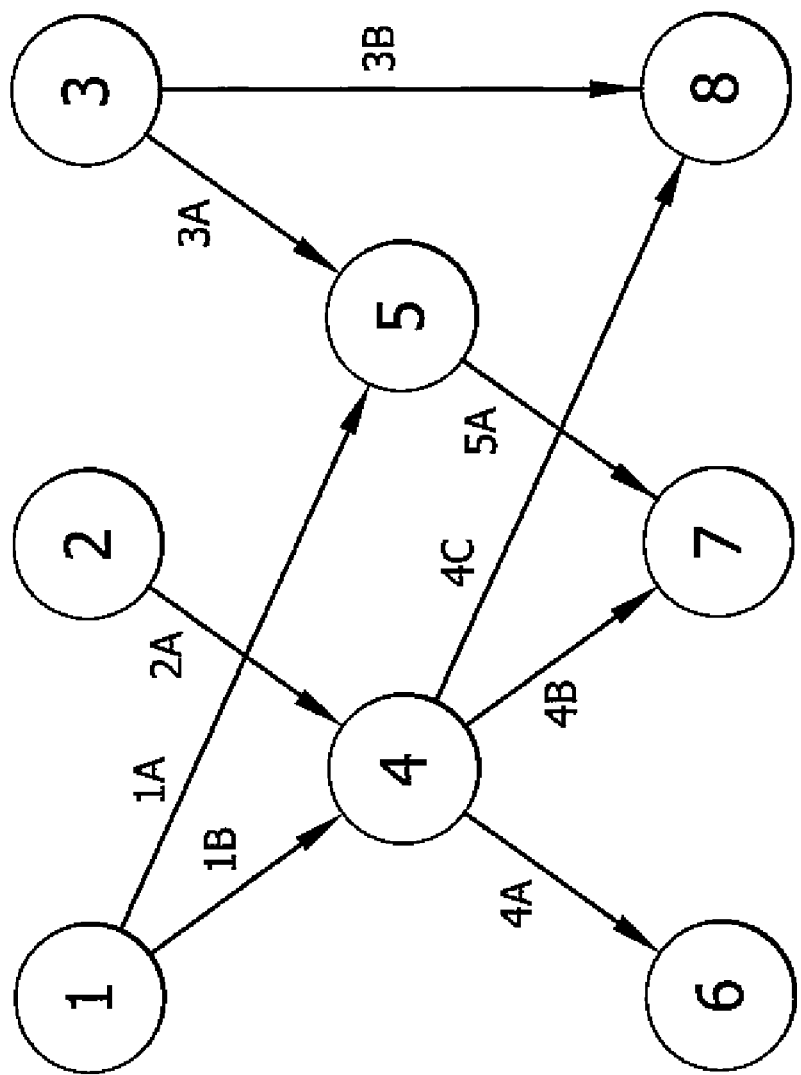
FIG. 9 shows pins in a network for topological sorting.

Topological sort is a method for arranging the nodes of a directed acyclic graph (DAG) in a particular order which can be seen in FIG. 9. A logic network 900 can be represented as a DAG where a pin is a node 1 (for example) and edge 1A and 1B (for example) are directed from each node 1 to its successors, nodes 4 and 5. Topological sorting may calculate congestion using several steps. First, a list of start nodes 1, 2, and 3, nodes which have no incoming edges, are inserted into a set S, (at least one such node must exist in an acyclic graph). Second, an empty list L is created that will contain the sorted nodes. Third, a node 1 (for example) is removed from set S and inserted into list L. Fourth, for each node 4 (for example) (a node with an edge 1B from node 1 to node 4), remove the edge 1B from the graph. Fifth, if node 4 has no other incoming edges 2A, then inset node 4 into set S. However, because node 4 has another incoming edge 2A, the topological sorting moves onto another node 2 (for example) in set S. If the logic network 900 still has edges, an error message is output, meaning that the graph has at least one cycle. If the logic network 900 does not still have edges, a message is output with the proposed topologically sorted order of list L.

An alternative method for topological sort is based on depth-first search. First, a list of start nodes 1, 2, and 3 are inserted into a set S. Second, an empty list L is created that will contain the sorted nodes. Third, if node 1 (for example) in set S has not been visited yet then mark node 1 as visited. Fourth, if node 4 (for example) (a node with an edge 1B from node 1 to node 4), has not been visited yet then mark node 4 as visited. Fifth, add node 1 to list L. Each node 4 (for example) gets added to list L only after considering all nodes on which node 4 depends. Another alternative method bypasses the aforementioned steps, processing the path count of each pin immediately in lieu of being added to a list.

Fourth, each pin in the critical network may be grouped into a class (step 440 in FIG. 4) where pins with approximately equivalent hold slacks are grouped into the same class (for simplicity, the example provided has hold slacks with whole numbers). The user may specify a rule for numeric rounding to identify what is approximately equivalent. Pins with a negative setup slack or a setup slack less than a user-specified value are excluded. Grouping the pins into classes may be used to prioritize the pins that are causing the biggest problem in the logic network.

FIG. 10 illustrates a chart grouping the pins in the critical network of FIG. 5 into classes with equivalent hold slack (the hold slack values of FIG. 3 are used to sort the pins of the critical network in FIG. 5). Class A has a hold slack of 1, Class B has a hold slack of 2, and Class C has a hold slack of 4. As shown in FIG. 8, pins 510, 511, and 513 are all grouped in Class A, based on the equivalent hold slack value of 1. Pins 501, 504, 505, 506, 512, 514, 515, 516, 517, 518, 521, 522, 523, 524, 525, and 527 are all grouped in Class B, based on the equivalent hold slack value of 2. All the remaining pins in the critical network of FIG. 5 are grouped in Class C, based on the equivalent hold slack value of 4.

Fifth, the pins in each pin class may be ranked by order of calculated critical congestion (step 450 in FIG. 4), starting with the class of pins that has the least hold slack and continuing with the remaining classes in order of increasing hold slack. The pins in each pin class may continue to be ranked until no other classes exist or until a class is reached with a hold slack greater than the user specified-threshold. The pin having the greatest critical congestion is ranked highest. In the case where two or more pins have the same critical congestion, the pins may then be ranked by their general congestion. A pin with less calculated general congestion, calculated above (step 420 in FIG. 4), is ranked higher.

FIG. 11 illustrates a chart ranking the pins of Class C. Each pin in Class C is ranked based on it critical congestion value (the critical congestion values of FIG. 5 are used to rank the pins). Pins 502 and 509 are ranked 1 because they have the highest critical congestion value, 2, while the remaining pins are all ranked 2 because they have a critical congestion value of 1. Pins 502 and 509 have the same critical congestion value and in order to break the tie, the general congestion value of both pins 502 and 509 is considered. The pin with the lower general congestion is ranked higher. As shown in FIG. 11, pin 509 has a lower general congestion, a value of 8, and is therefore ranked higher than pin 502. The last column in FIG. 11 illustrates the final ranking of all pins after the tie between pins 502 and 509 has been broken. Pin 509 is ranked 1 overall.

Figure 12:
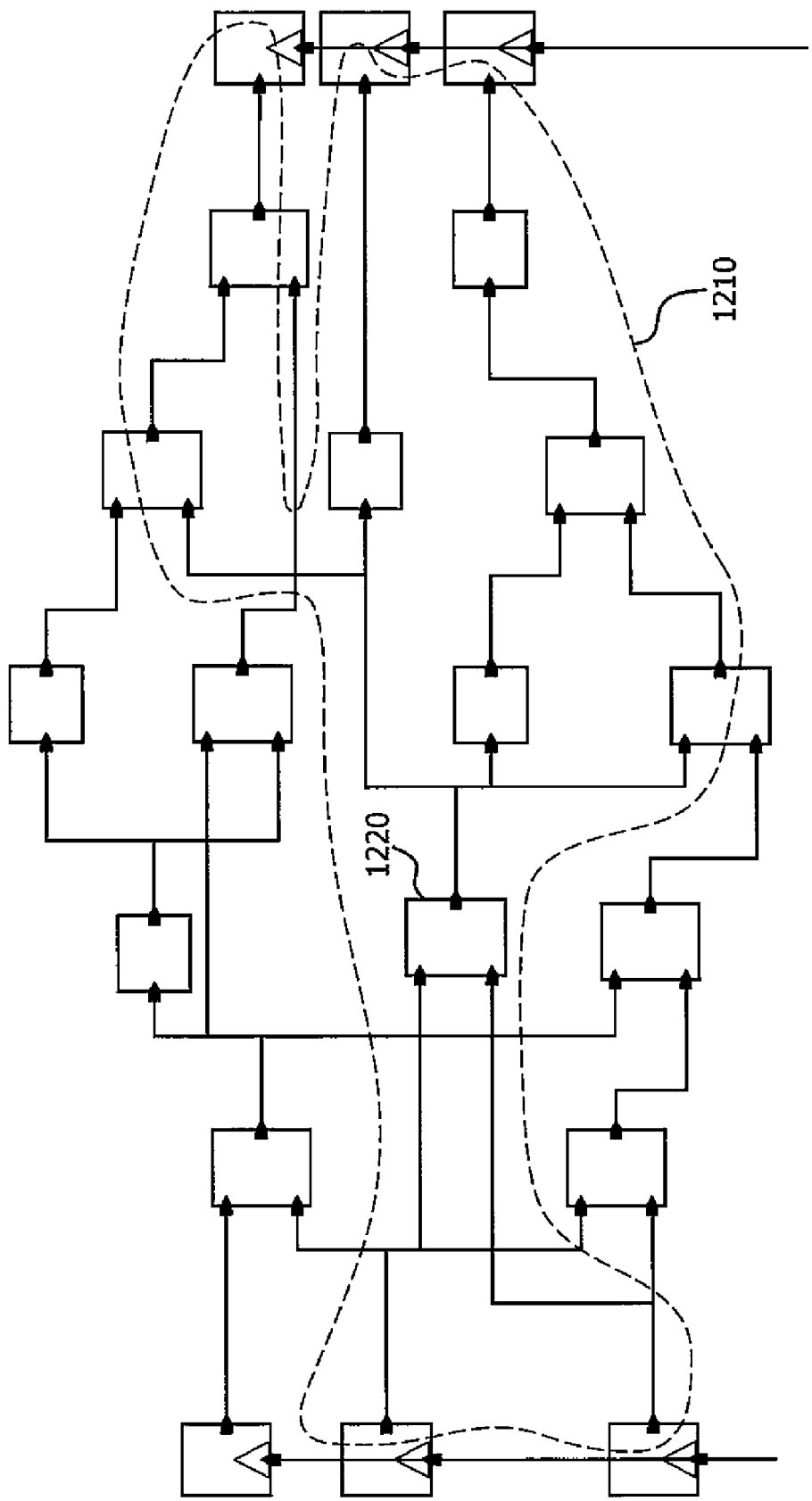
FIG. 12 shows a logic cone.

For each pin, in order of decreasing rank, it may be determined whether the pin has been tagged with the number of times STA has been performed. If a pin has been tagged in a previous iteration, it may already be marked with a number (step 480 in FIG. 4). For example if this is the fourth time STA has been performed, the pin may have been identified as an insertion point ht second time STA was performed and would be marked with a 2. Therefore, since 2 is less than 4, this pin is recommended as an insertion point. If a pin has not been tagged or it has been tagged with a number less than the number of times STA has been performed, recommend this pin as an insertion point for a delay cell (step 470 in FIG. 4). This pin is tagged and the pins in its logic cone with the number of times STA has been performed. FIG. 12 illustrates a logic cone 1210. A logic cone 1210 of pin 1220 may be defined as a set of pins that can be reached by traversing the network in either a forward or backward manner starting from pin 1220. A logic cone 1210 may be the set of all pins contained in both the transitive fan-in and transitive fan-out.

Sixth, the network may be modified by inserting delay cells at each of the recommended insertion points (step 490 in FIG. 4).

Figure 13:
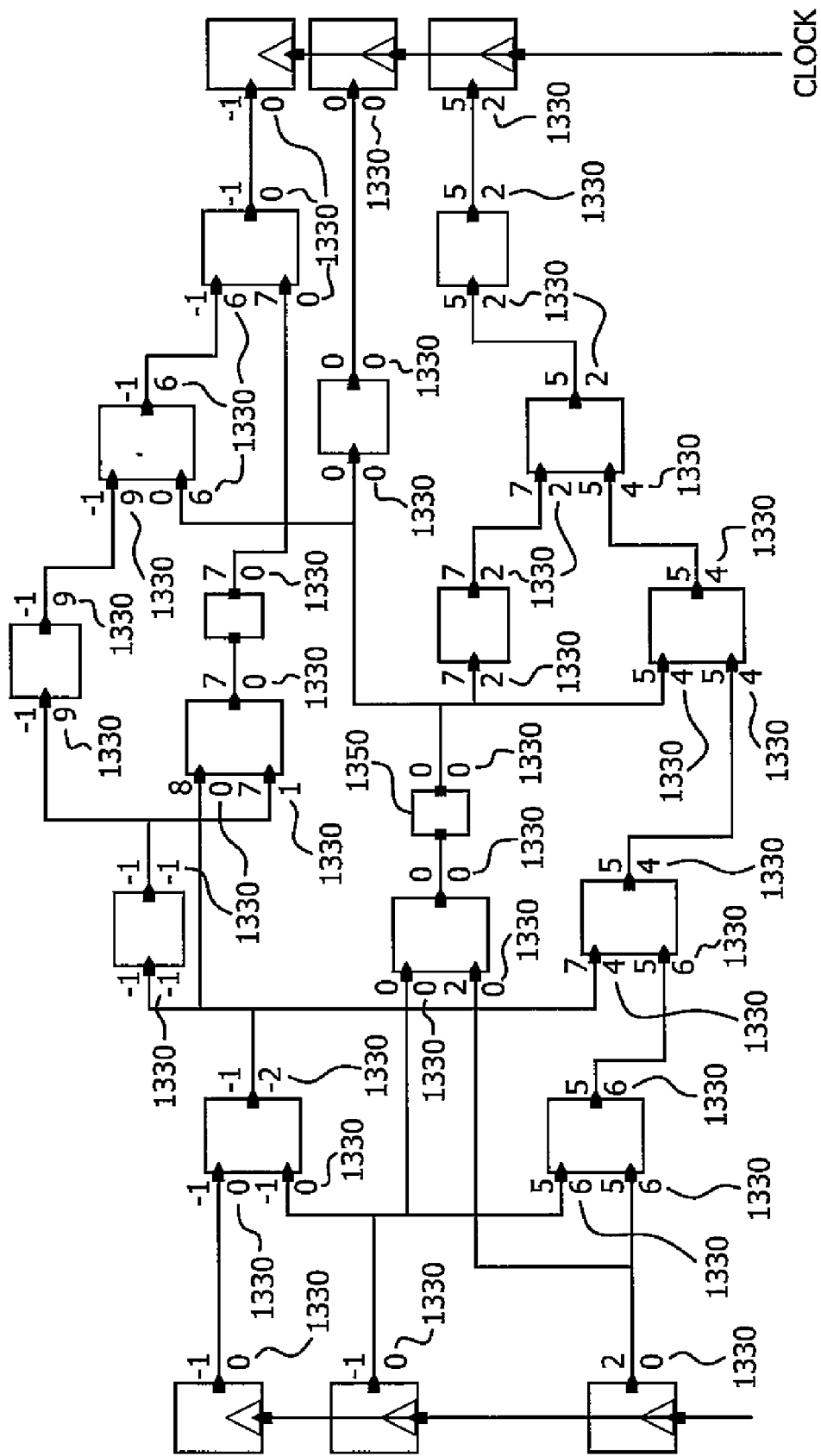
FIG. 13 shows a fixed network with inserted delay cells.

Steps one to six may be repeated until no further pins are recommended (step 495 in FIG. 4), providing an improved network which is less likely to fail due to hold time violation. FIG. 13 illustrates a fixed network with inserted delay cells.

The network 1300 includes inserted delay cells 1350 (one at pin 509 of FIG. 5, which was ranked 1 and therefore recommended as an insertion point for a delay cell). The hold slack 1330 of each pin has a value greater or equal to a user-specified threshold of zero. These hold slack 1330 (for example) values illustrate that the inserted delay cells 1350 may improve the network and decrease the likelihood of failing due to a hold time violation.

Although features and elements are described above in particular combinations, each feature or element may be used alone without the other features and elements or in various combinations with or without other features and elements. The apparatus described herein may be manufactured by using a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Embodiments of the present invention may be represented as instructions and data stored in a computer-readable storage medium. For example, aspects of the present invention may be implemented using Verilog, which is a hardware description language (HDL). When processed, Verilog data instructions may generate other intermediary data (e.g., netlists, GDS data, or the like) that may be used to perform a manufacturing process implemented in a semiconductor fabrication facility. The manufacturing process may be adapted to manufacture semiconductor devices (e.g., processors) that embody various aspects of the present invention.

Suitable processors include, by way of example, a general purpose processor, a special purpose processor, a conventional processor, a digital signal processor (DSP), a plurality of microprocessors, a graphics processing unit (GPU), a DSP core, a controller, a microcontroller, application specific integrated circuits (ASICs), field programmable gate arrays (FPGAs), any other type of integrated circuit (IC), and/or a state machine, or combinations thereof.

What is claimed is:

1. A method on an apparatus for improving hold slack in a logic network comprising:
    a processor of the apparatus performing static timing analysis to determine a setup slack and a hold slack for each pin in the logic network;
    the processor determining a critical network based on the hold slack for each pin in the logic network;
    the processor calculating a critical congestion for each pin in the critical network;
    the processor grouping pins into pin classes where pins with a same hold slack are grouped in a same pin class;
    the processor ranking each pin in the same pin class based on the critical congestion of the pin, wherein a pin having a highest critical congestion is ranked highest;
    the processor tagging the highest ranked pin as an insertion point; and
    the processor inserting a delay cell at the insertion point.

2. The method of claim 1, wherein the critical network is defined by the hold slack for each pin in the logic network that is less than a user-specified threshold.

3. The method of claim 1, further comprising:
    the processor calculating a general congestion for each pin in the logic network.

4. The method claim 3, wherein the general congestion for each pin is used to break a tie between pins with the same critical congestion.

5. The method of claim 4, wherein the pin having a lowest general congestion is ranked highest.

6. The method of claim 1, further comprising:
    the processor determining whether each ranked pin has been previously tagged.

7. The method of claim 6, wherein determining comprises:
    the processor determining whether each ranked pin has been previously tagged and for each ranked pin determined to not have been previously tagged, inserting a delay cell.

8. The method of claim 1, further comprising repeating the steps of performing, determining, calculating, grouping, ranking, tagging and inserting until no further pin is tagged as an insertion point.

9. The method of claim 1, wherein calculating critical congestion is performed by levelization.

10. The method of claim 1, wherein calculating critical congestion is performed by topological sorting.

11. The method of claim 1, wherein calculating critical congestion is performed by depth first search.

12. An apparatus for improving hold slack in a logic network comprising:
    a static timing analyzer configured to perform static timing analysis and output a setup slack and a hold slack for each pin in the logic network; and
    a processor configured to:
        determine a critical network based on the hold slack for each pin in the logic network;
        calculate a critical congestion for each pin in the critical network;
        group pins into pin classes where pins with a same hold slack are grouped in a same pin class;
        rank each pin in the same pin class based on the critical congestion of the pin, wherein a pin having a highest critical congestion is ranked highest;
        tag the highest ranked pin as an insertion point; and
        insert a delay cell at the insertion point.

13. The apparatus of claim 12, wherein the critical network is defined by the hold slack for each pin in the logic network that is less than a user-specified threshold.

14. The apparatus of claim 12, wherein the processor is further configured to calculate a general congestion for each pin in the logic network.

15. The apparatus of claim 14, wherein the general congestion for each pin is used to break a tie between pins with the same critical congestion.

16. The apparatus of claim 15, wherein the pin having the lowest general congestion is ranked highest.

17. The apparatus of claim 12, wherein the processor is further configured to determine whether each pin has been previously tagged.

18. The apparatus of claim 17, wherein the processor is further configured to insert a delay cell when the ranked pin has not previously been tagged.

19. A non-transitory computer-readable storage medium storing a set of instructions for execution by one or more processors to perform hold slack improvement, the set of instructions comprising:
    a static timing analysis segment for performing static timing analysis to determine a setup slack and a hold slack for each pin in the logic network;
    a critical network segment for determining a critical network based on the hold slack for each pin in the logic network;

a critical congestion segment for calculating critical congestion for each pin in the critical network;

a grouping segment for grouping pins into pin classes where pins with a same hold slack are grouped in a same pin class;

a ranking segment for ranking each pin in the same pin class based on the critical congestion of the pin, wherein a pin having a highest critical congestion is ranked highest;

a tagging segment for tagging the highest ranked pin as an insertion point; and an inserting segment for inserting a delay cell at the insertion point.

20. The non-transitory computer-readable storage medium according to claim 19, wherein the set of instructions are hardware description language (HDL) instructions used for the manufacture of a device.

* * * * *